United States Patent
Lowell et al.

(10) Patent No.: US 7,889,499 B2
(45) Date of Patent: Feb. 15, 2011

(54) INTEGRATED REPLACEABLE ENERGY STORAGE AND COOLANT MODULE

(75) Inventors: Reid F. Lowell, Ontario (CA); Kenneth W. Brown, Yucaipa, CA (US); A-Lan V. Reynolds, Tucson, AZ (US); Alan A. Rattray, Alta Loma, CA (US)

(73) Assignee: Raytheon Company, Waltham, MA (US)

( * ) Notice: Subject to any disclaimer, the term of this patent is extended or adjusted under 35 U.S.C. 154(b) by 44 days.

(21) Appl. No.: 12/405,142

(22) Filed: Mar. 16, 2009

(65) Prior Publication Data

US 2009/0310308 A1      Dec. 17, 2009

Related U.S. Application Data

(63) Continuation-in-part of application No. 11/867,579, filed on Oct. 4, 2007, now Pat. No. 7,784,390, which is a continuation-in-part of application No. 11/207,049, filed on Aug. 18, 2005, now Pat. No. 7,490,538.

(51) Int. Cl.
*H05K 7/20* (2006.01)
(52) U.S. Cl. .................. 361/689; 361/688; 361/690; 361/700; 165/104.26; 165/104.33
(58) Field of Classification Search .................. None
See application file for complete search history.

(56) References Cited

U.S. PATENT DOCUMENTS

| | | | |
|---|---|---|---|
| 4,325,305 A | 4/1982 | Pastine | |
| 6,307,746 B1 * | 10/2001 | Beckman | 361/679.46 |
| 6,487,950 B2 | 12/2002 | Samland | |
| 6,542,359 B2 * | 4/2003 | Babcock et al. | 361/679.46 |
| 6,799,499 B2 | 10/2004 | Seregelyi et al. | |
| 6,843,178 B2 | 1/2005 | Wood et al. | |
| 7,272,002 B2 * | 9/2007 | Drapeau | 361/679.48 |
| 7,742,298 B2 * | 6/2010 | Kunz | 361/690 |
| 2005/0156743 A1 | 7/2005 | Gallivan et al. | |
| 2008/0310108 A1 * | 12/2008 | Eriksson et al. | 361/697 |

FOREIGN PATENT DOCUMENTS

EP      1 396 699      3/2004

* cited by examiner

*Primary Examiner*—Boris L Chervinsky
(74) *Attorney, Agent, or Firm*—SoCal IP Law Group LLP; John E. Gunther; Steven C. Sereboff

(57) ABSTRACT

There is disclosed a self-contained electronic apparatus containing at least some power-dissipating components which may require cooling. The self-contained electronic apparatus may also include a removable and replaceable energy storage module. The removable and replaceable energy storage module may include a power element to provide electrical energy for the self-contained electronic apparatus and a cooling element to cool at least a portion of the power dissipating components.

24 Claims, 7 Drawing Sheets

INTEGRATED REPLACEABLE ENERGY STORAGE AND COOLANT MODULE

RELATED APPLICATION INFORMATION

This patent is a continuation-in-part of application Ser. No. 11/867,579, entitled "SOLID-STATE NON-LETHAL DIRECTED ENERGY WEAPON", filed Oct. 4, 2007, which is a continuation-in-part of application Ser. No. 11/207,049, "WEAPON HAVING LETHAL AND NON-LETHAL DIRECTED ENERGY PORTIONS", filed Aug. 18, 2005, now U.S. Pat. No. 7,490,538, the contents of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to self-contained battery-powered electronic systems where at least a portion of the electronic system requires cooling.

2. Description of the Related Art

Portable power tools commonly use easily removable and rechargeable battery modules such that a tool can be used with a first battery module while one or more additional battery modules are being recharged for future use. Thus, through the use of multiple easily replaced battery modules, a tool can be used nearly continuously without incurring the weight of a large battery. The components of portable power tools and common portable electronic equipment either do not require cooling or are cooled by convection or forced flow of ambient air.

Other types of portable electronic apparatus include high power dissipation components that cannot be cooled by convection or forced ambient air. Such types of apparatus may include microwave and laser directed energy sources used as weapons, microwave and ultraviolet energy sources used for sterilization, and laser energy sources used for construction tasks such as cutting and welding.

Within this description, the term "self-contained electronic apparatus" is used to describe electronic equipment that must be operable without connection to an infrastructure that provides either electrical power or cooling. A self-contained electronic apparatus would typically be portable and may be adapted to be carried by a man or team of men. A vehicle-mounted apparatus that receives electrical power from a motor-driven generator or cooling from a motor-driven air conditioner would not be considered a "self-contained electronic apparatus" for the purpose of this description.

DETAILED DESCRIPTION

Description of Apparatus

Figure 1:
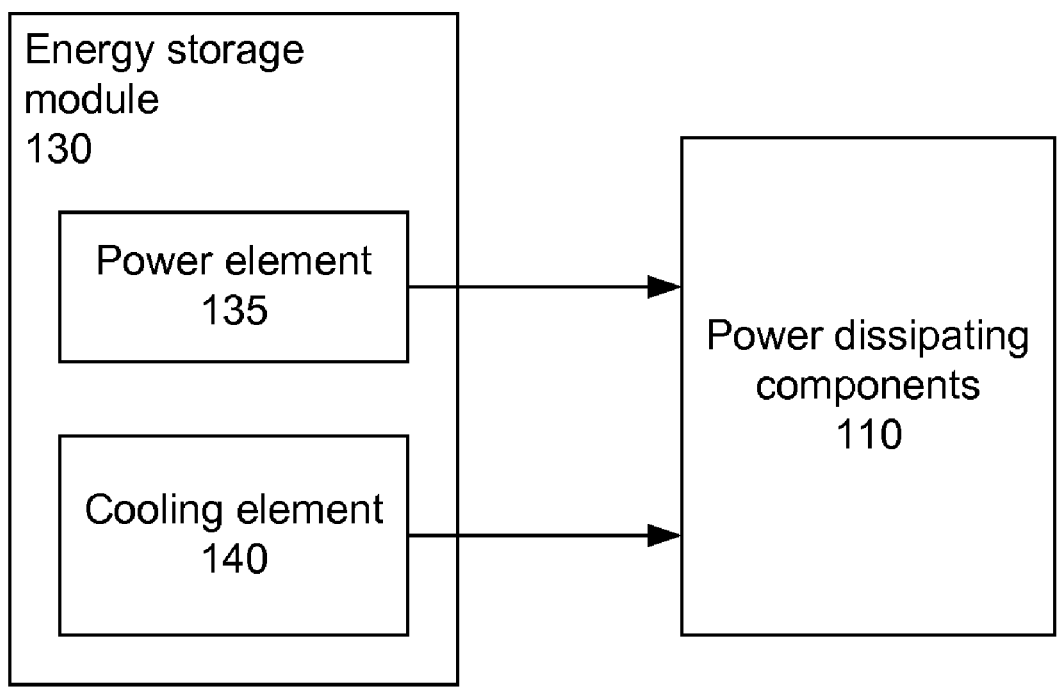
FIG. 1 is a functional block diagram of a self-contained electronic apparatus.

Referring now to FIG. 1, a self-contained electronic apparatus 100 may include power dissipating components 110 and a removable and replaceable energy storage module 120. The energy storage module 120 may include a power element 130 to provide electrical power to the power dissipating components 110. The energy storage module 120 may include a cooling element 140 to cool at least a portion of the power dissipating components 110.

The energy storage module 120 may be expendable, in which case a depleted energy storage module may be discarded. The energy storage module 120 may be rechargeable. Both the power element 130 and the cooling element 140 of a rechargeable energy storage module may be adapted to be recharged or otherwise restored to an operating condition after being depleted.

The power element 130 may include a rechargeable or disposable battery or battery pack, a chemical battery, a fuel cell, or other energy storage elements. The cooling element 140 may include a reservoir holding a coolant and/or a phase change material.

Both the power element 130 and the cooling element 140 may have finite capacity, and both the power element 130 and the cooling element 140 may become depleted during use. The self-contained electronic equipment 100 may be inoperable if either the power element 130 or the cooling element 140 is depleted. The capacity of the power element 130 may support operation of the self-contained equipment, under nominal operating conditions, for a predetermined time period. The capacity of the cooling element 100 may support operation of the self-contained equipment, under nominal operating conditions, for essentially the same time period. In this case, under nominal operating conditions, the power element 130 and the cooling element 140 may become depleted at essentially the same time. The power element can the cooling may be considered to be depleted at "essentially" the same time if only a small fraction of the initial capacity remains in either the power element or the cooling element when the other element is fully depleted. The small fraction remaining may be 10% or less, for example, of the initial capacity Although the capacities of the power element 130 and the cooling element 140 maybe adapted to support operation of the self-contained electronic apparatus 100 for the same time period under nominal operating conditions, the quantitative capacities of the power element 130 and the cooling element 140, each measured in watt-hours for example, may not be the same. The quantitative capacity of the power element 130 and the cooling element 140 may be different since the efficiency of the power distribution system and the cooling system may be different, and since the cooling element may cool only a portion of the power dissipating components in the self-contained electronic apparatus 100.

Although the capacities of the power element 130 and the cooling element 140 maybe adapted to support operation of the self-contained electronic apparatus 100 for the same time period under nominal operating conditions, the power element 130 and the cooling element 140 may not be depleted simultaneously under other operating conditions. For example, in extremely cold ambient conditions, the capacity of the power element 130 may be reduced, and the demand on the cooling element 140 may also be reduced, such that the cooling element 140 may have significant capacity remaining when the power element 130 becomes depleted.

Figure 2:
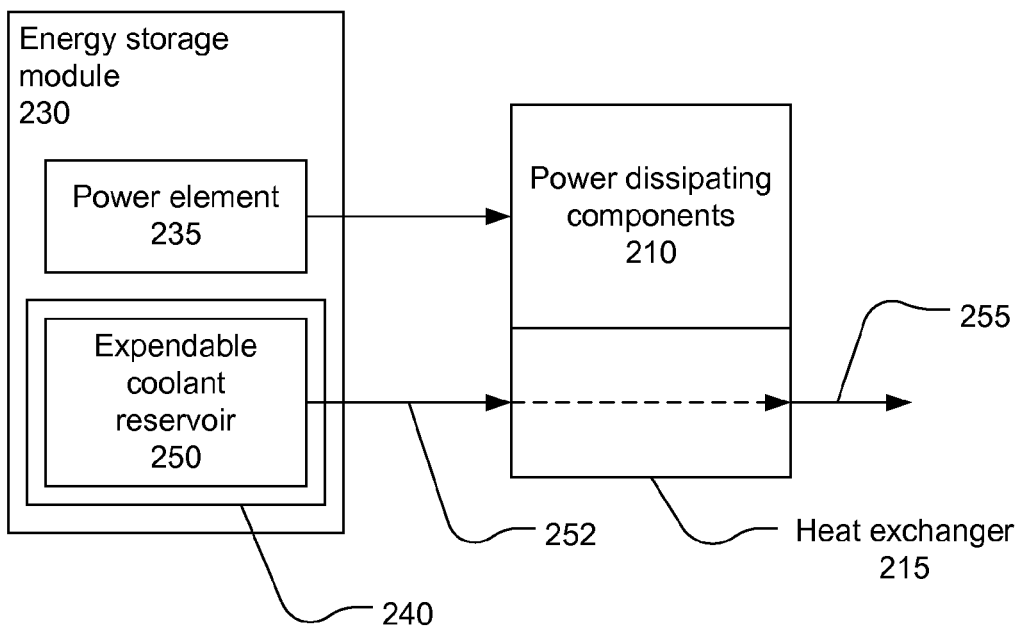
FIG. 2 is a functional block diagram of a self-contained electronic apparatus.

Referring now to FIG. 2, a self-contained electronic apparatus 200, which may be the self-contained electronic apparatus 100, may include an expendable coolant reservoir 250 as a portion of a cooling element 240. The expendable coolant reservoir 250 may store a coolant which may be a compressed gas or a liquid. The coolant may flow, as indicated by arrow 252, from the expendable coolant reservoir 250 through a heat exchanger 215 coupled to the power dissipating components 210, and then be discarded as indicated by arrow 255.

The heat exchanger 215 may be any mechanism that facilitates transferring heat from the power dissipating components 210 to the coolant. In a simple example of a heat exchanger, the coolant may flow directly over the power dissipating components 110. The heat exchanger 215 may be a heat-conductive structure thermally coupled to the power dissipating components 210. The coolant may flow through or against the heat-conductive structure. The heat exchanger may include fins, vanes, slots, channels, posts, slots, jets, and other mechanisms known to facilitate heat transfer from a component to a coolant.

The coolant reservoir 250 may store a compressed gas, which may be at least partially a liquid during storage. The compressed gas may be released to flow under its own pressure through the heat exchanger 215 and then be released to the ambient air (arrow 255). The coolant reservoir 250 may store a liquid that flows through the heat exchanger and is then released to the ambient air (arrow 255). A liquid coolant may be propelled by pressure from an auxiliary supply of compressed gas (not shown), by capillary action, by a pump included in the energy storage module 220 or elsewhere in the electronic apparatus 200, or by some other mechanism. A liquid coolant may be a phase change material that changes from a liquid phase to a gaseous phase within the heat exchanger 215.

The cooling element 240 may be recharged by refilling the expendable coolant reservoir 250 with the appropriate gaseous or liquid coolant. In an embodiment where a liquid coolant is propelled by pressure from an auxiliary supply of compressed gas, both the liquid coolant and the auxiliary gas supply may be refilled. The cooling element 240 may be recharged concurrently with recharging the power element 230.

Figure 3:
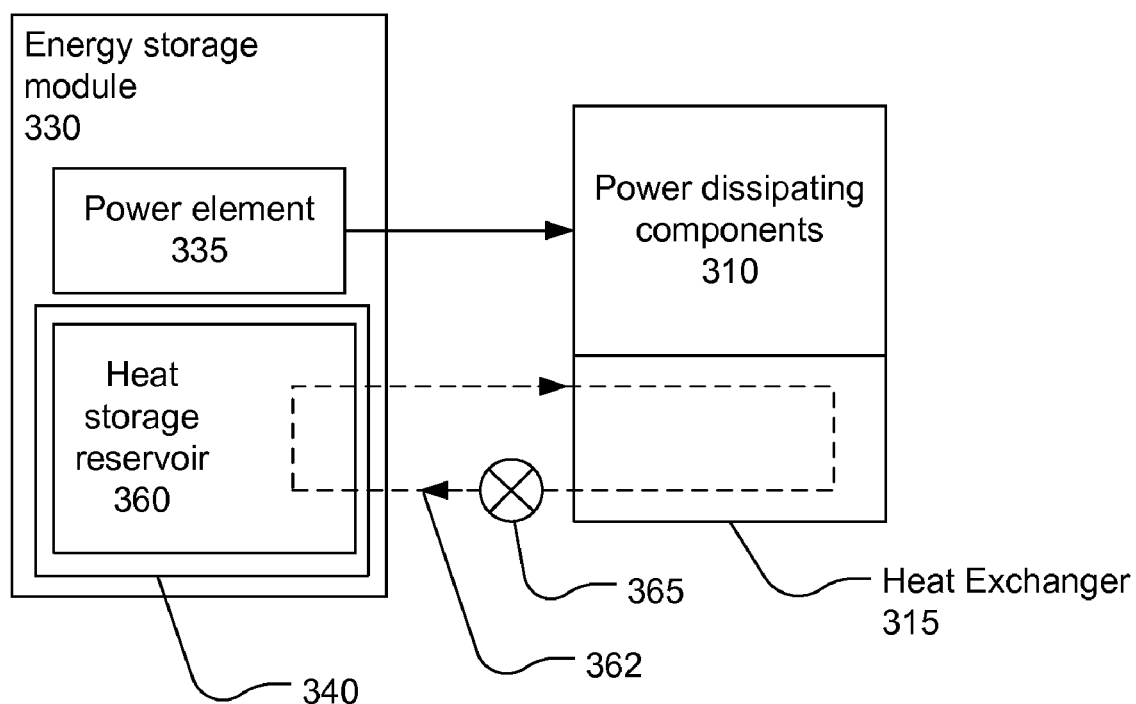
FIG. 3 is a functional block diagram of a self-contained electronic apparatus.

Referring now to FIG. 3, a self-contained electronic apparatus 300, which may be the self-contained electronic apparatus 100, may include a heat storage reservoir 360 as a portion of a cooling element 340. The heat storage reservoir 360 may be filled, for example, with a phase change material. The phase change material may be an inorganic or organic material, for example a wax, that is capable of absorbing a large quantity of heat while changing from a solid phase to a liquid phase, or from a liquid phase to a gas phase.

A coolant may be circulated, as indicated by arrow 362, from the heat storage reservoir 360 through a heat exchanger 315 coupled to the power dissipating components 310. The coolant flow 362 may conduct heat from the power dissipating components 310 to the heat storage reservoir 360 and thus effectively cool the power dissipating components.

The heat exchanger 315 may be any mechanism that facilitates transferring heat from the power dissipating components 310 to the coolant. In a simple example of a heat exchanger, the coolant may flow directly over the power dissipating components 310. The heat exchanger 315 may be a heat-conductive structure thermally coupled to the power dissipating components 310. The coolant may flow through or against the heat-conductive structure. The heat exchanger may include fins, vanes, slots, channels, posts, slots, jets, and other mechanisms known to facilitate heat transfer from a component to a coolant.

The coolant may be a gas or a liquid. The coolant may be propelled by capillary action, by a pump 365 included in the electronic apparatus 300, or by some other mechanism. A liquid coolant may be also be a phase change material that changes from a liquid phase to a gaseous phase within the heat exchanger 215.

The cooling element 340 may be recharged by removing the heat held in the heat storage reservoir 360. The heat may be removed, for example, by circulating a chilled coolant through the heat storage reservoir 360 until the temperature of the phase change material is reduced below the phase transition temperature, such that the phase change material reverts to its original phase. The coolant used to recharge the heat storage reservoir 360 may be the same coolant circulated through the heat storage reservoir 360 when the energy storage module 330 coupled to the self-contained electronic apparatus 300. The cooling element 340 may be recharged concurrently with recharging the power element 330.

Figure 4A:
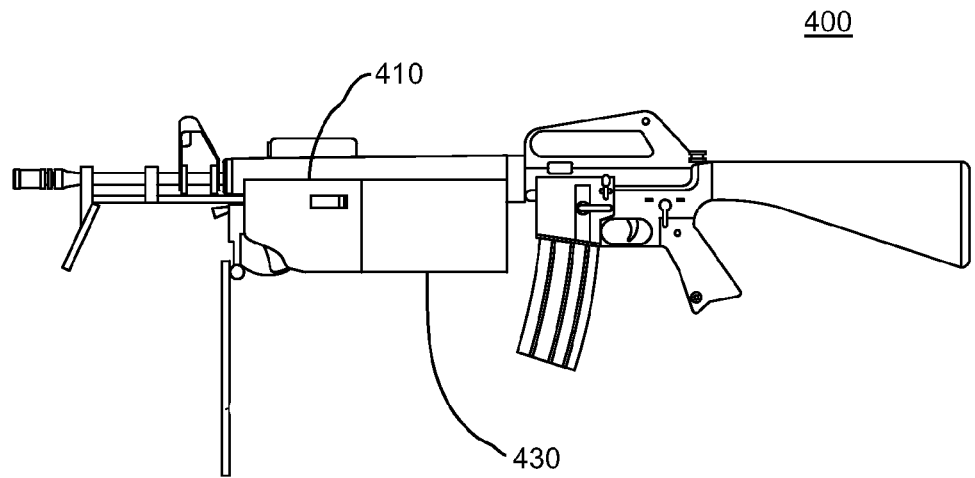
FIG. 4A is a side view of a combined lethal and non-lethal weapon.
Figure 4B:
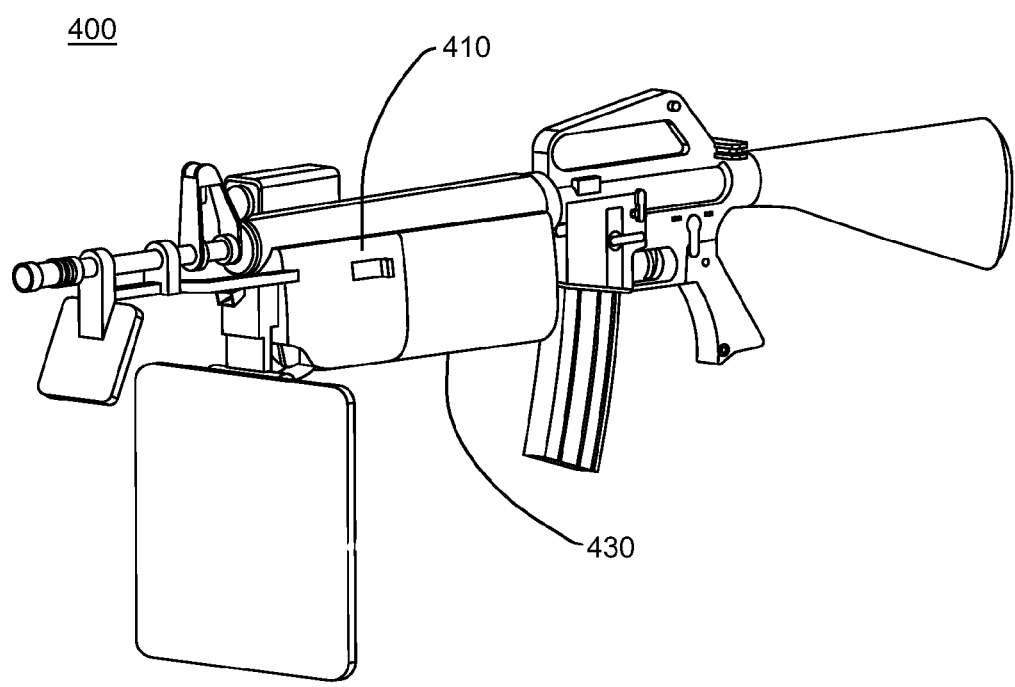
FIG. 4B is a perspective view of a combined lethal and non-lethal weapon.

FIG. 4A and FIG. 4B show side and perspective views, respectively, of a self-contained electronic apparatus 400 which may be a combined lethal/non-lethal weapon as described in U.S. Pat. No. 7,490,538. The self-contained electronic apparatus 400 may include power dissipating components 410, which may be a high power millimeter wave amplifier. The self-contained electronic apparatus 400 may include a removable and replaceable energy storage module 430 that may be coupled to the power dissipating components 410.

Figure 5:
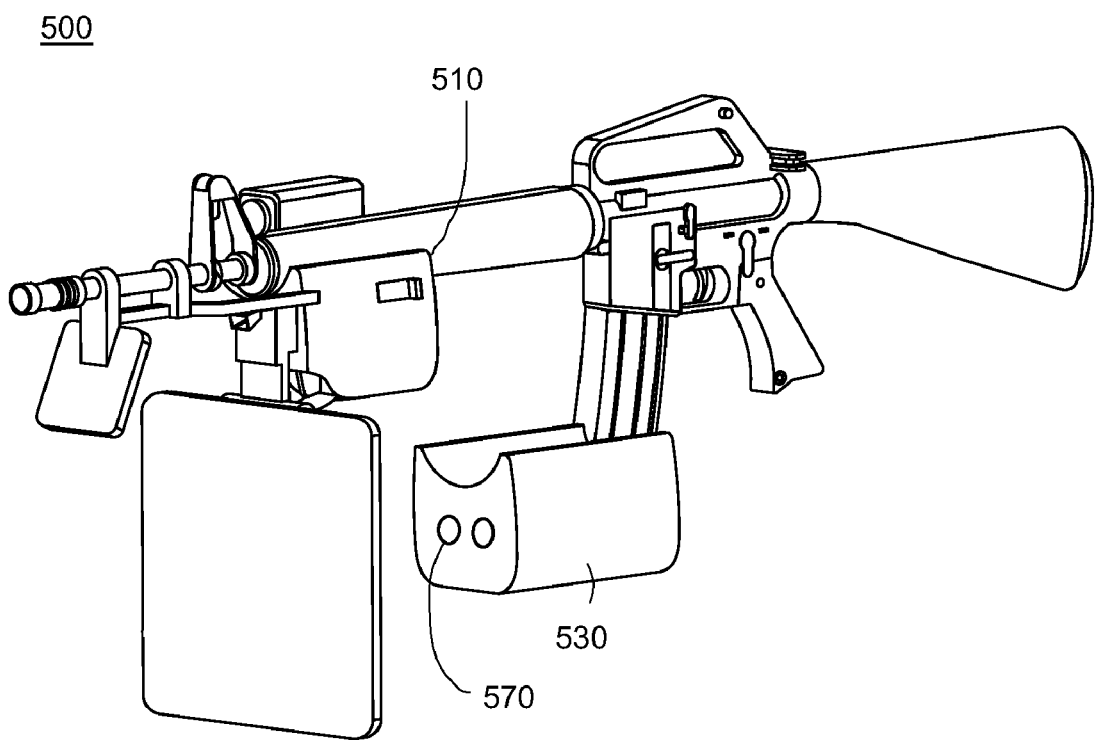
FIG. 5 is a perspective view of a combined lethal and non-lethal weapon with an energy storage module detached.

FIG. 5 shows a perspective view of a removable and replaceable energy storage module 530 detached from the self-contained electronic apparatus 500, which may be the self-contained electronic apparatus 400. The removable and replaceable energy storage module 530 may include one or more connectors 570 to mate with heat dissipating components 510. The one or more connectors 570 may include electrical contacts to carry electrical power from the replaceable energy storage module 530 to the self-contained electronic apparatus 500. The one or more connectors 570 may include a self-sealing coupling to conduct a fluid coolant between the removable and replaceable energy storage module 530 and the heat dissipating components 510.

Figure 6:
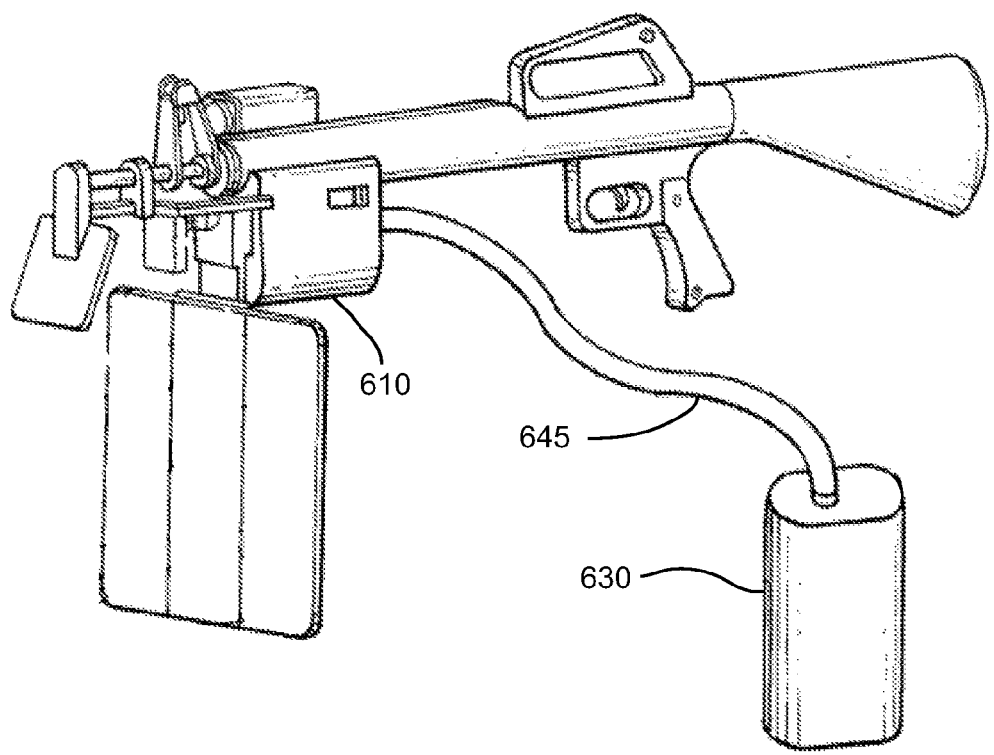
FIG. 6 is a perspective view of a non-lethal directed energy weapon.

FIG. 6 shows a perspective view of a self-contained electronic apparatus 600 which may be a solid state non-lethal directed energy weapon as described in U.S. patent application Ser. No. 11/867,579. The self-contained electronic apparatus 600 may include power dissipating components 610, which may be a high power millimeter wave amplifier. The self-contained electronic apparatus 600 may include a removable and replaceable energy storage module 630 that may be coupled to the power dissipating components 610 by an umbilical cable 645. The removable and replaceable energy storage module 630 may be adapted to be carried external to the system 600, such as in a belt pack, a backpack, or by some other method.

The umbilical cable 645 may include electrical conductors to carry electrical power from the replaceable energy storage module 630 to the self-contained electronic apparatus 600. The umbilical cable 645 may include tubing to conduct a fluid coolant between the removable and replaceable energy storage module 630 and the heat dissipating components 610. One or both ends of the umbilical cable 645 may be equipped with one or more connectors to couple to the self-contained electronic apparatus 600 or to the removable and replaceable energy storage module 630. The connectors may include electrical contacts and self-sealing couplings to conduct electrical power and the fluid coolant between the removable and replaceable energy storage module 630 and the heat dissipating components 610.

Description of Processes

Figure 7:
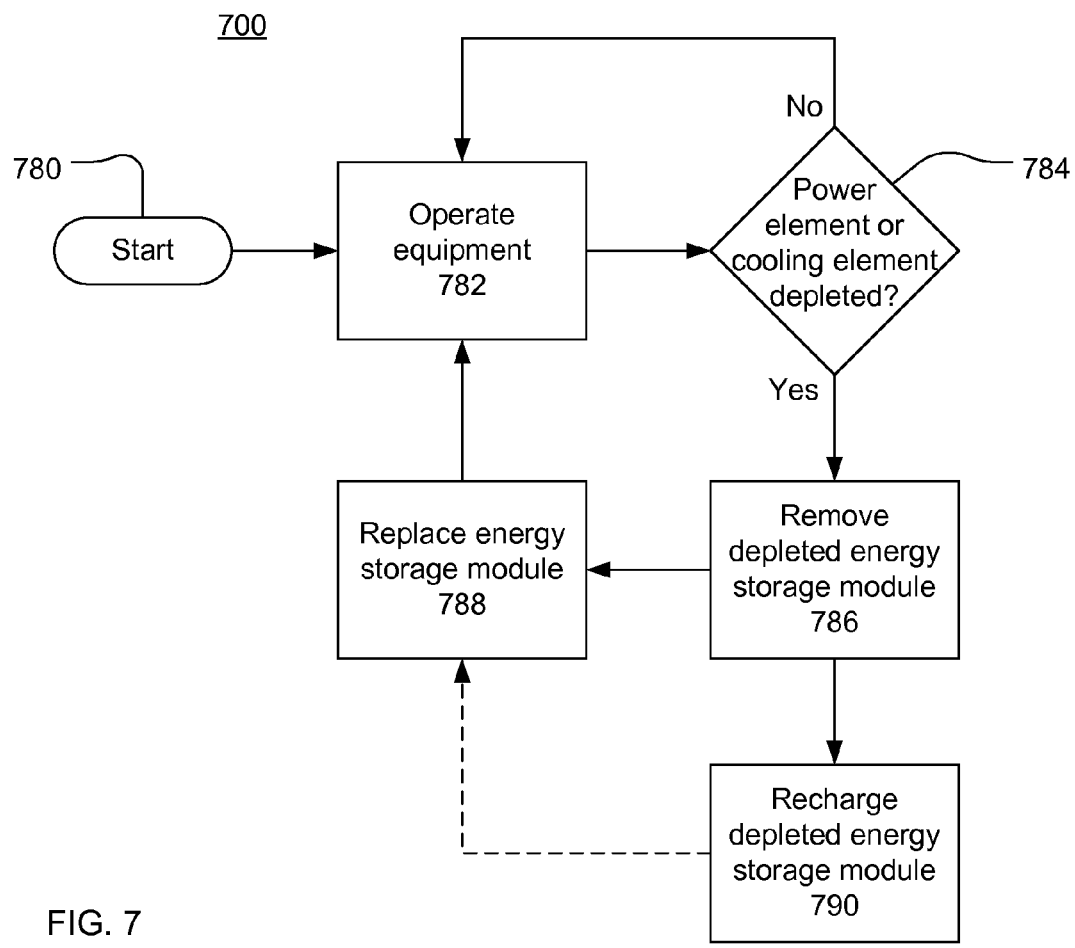
FIG. 7 is a flow chart of a method of using a self-contained electronic apparatus.

Referring now to FIG. 7, a process 700 for operating a self-contained electronic apparatus begins at 780 where the self-contained electronic apparatus is assumed to include a fully-charged first energy storage module, which may contain a power element and a cooling element. The self-contained electronic equipment is operated at 782, while the status of the power element and the cooling element within the first energy storage module is monitored at 784. The status of the power element and the cooling element may be monitored by measuring one or more parameters. For example, the measured parameters may include the voltage of a battery included in the power element, the pressure of a compressed gas included in the cooling element, the temperature of a phase change material included in the cooling element, or some other parameters indicative of the status of the power element and the cooling element.

The operation of the self-contained electronic equipment may continue at 782 until a determination is made at 784 that one or both of the power element and the cooling element within the first energy storage module is depleted. The power element and the cooling element may be determined to be depleted if a measured parameter is outside of a predetermined range. For example, a power element may be determined to be depleted if the voltage produced be a battery falls below a predetermined minimum operating voltage. For further example, a cooling element may be determined to be depleted if the pressure of a compressed gas falls below a predetermined minimum pressure, or if the temperature of a phase change material rises above a predetermined maximum temperature.

The depleted first energy storage module may be removed at 786 and replaced with a second energy storage module, which may be fully charged, at 788 to allow operation to continue at 782. The first energy storage module removed at 786 may be recharged at 790 and then made available for future use at 788. The first energy storage module may be recharged at 790 by recharging both a power element and a cooling element within the first energy storage module. The power element may be, for example, a rechargeable battery that may be recharged using conventional techniques. The cooling element may be a reservoir of an expendable coolant which may be recharged by refilling the reservoir. The cooling element may be a heat storage reservoir which may be recharged by removing the stored heat. For example, the heat storage reservoir may be filled with a phase change material which absorbs a substantial amount of heat while undergoing a transition from a first phase to a second phase. The stored heat may be removed, for example, by circulating a chilled coolant through the heat storage reservoir until the temperature of the phase change material is reduced below the phase transition temperature, such that the phase change material reverts to the first phase.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A self-contained electronic apparatus, comprising:
    one or more power-dissipating components
    an energy storage module comprising
        a housing detachable from the self-contained electronic apparatus
        a rechargeable power storage element contained within the housing, the rechargeable power storage element to store electrical energy to operate the self-contained electronic apparatus
        a rechargeable cooling element contained within the housing, the rechargeable cooling element to cool at the one or more power dissipating components.

2. The self-contained electronic apparatus of claim 1, wherein
    the rechargeable power storage element has a capacity to store energy to operate the self-contained electronic apparatus for a predetermined time period under nominal operating conditions, and the rechargeable cooling element has a capacity to cool the one or more power dissipating components for essentially the same time period under nominal operating conditions.

3. The self-contained electronic apparatus of claim 1, wherein the energy storage module attaches to the self-contained electronic apparatus by means of one or more connectors.

4. The self-contained electronic apparatus of claim 1, wherein the energy storage module attaches to the self-contained electronic apparatus by means of an umbilical cable.

5. The self-contained electronic apparatus of claim 1, wherein the rechargeable power storage element is a rechargeable battery.

6. The self-contained electronic apparatus of claim 1, wherein the rechargeable cooling element includes a reservoir.

7. The self-contained electronic apparatus of claim 6, wherein the reservoir stores a fluid coolant.

8. The self-contained electronic apparatus of claim 7, wherein the fluid coolant is a compressed gas.

9. The self-contained electronic apparatus of claim 6, wherein the reservoir is a heat storage reservoir containing a phase-change material.

10. The self-contained electronic apparatus of claim 9, wherein a fluid is circulated between the heat storage reservoir and a heat exchanger thermally coupled to the one or more power dissipating components.

11. The self-contained electronic apparatus of claim 1, wherein the rechargeable power storage element includes a rechargeable battery and the rechargeable cooling element includes a rechargeable reservoir.

12. The self-contained electronic apparatus of claim 11, wherein the rechargeable battery and the rechargeable reservoir are configured to be recharged simultaneously.

13. An energy storage module for a self-contained electronic apparatus, comprising
  a housing detachable from the self-contained electronic apparatus
  a rechargeable power storage element contained within the housing
  a rechargeable cooling element contained within the housing.

14. The energy storage module of claim 13, wherein
  the rechargeable power storage element has a capacity to store energy to operate the self-contained electronic apparatus for a predetermined time period under nominal operating conditions, and
  the rechargeable cooling element has a capacity to cool the one or more power dissipating components for essentially the same time period under nominal operating conditions.

15. The energy storage module of claim 13, wherein rechargeable the power storage element is a rechargeable battery.

16. The energy storage module of claim 13, wherein the rechargeable cooling element comprises a reservoir.

17. The energy storage module of claim 16, wherein the reservoir stores a fluid coolant.

18. The energy storage module of claim 17, wherein the fluid coolant is a compressed gas.

19. The energy storage module of claim 16, wherein the reservoir is a heat storage reservoir containing a phase-change material.

20. The energy storage module of claim 19, wherein the heat storage reservoir is adapted to have a fluid circulated between the heat storage reservoir and an electronic system to be cooled.

21. The removable and replaceable energy storage module of claim 13, wherein the rechargeable power storage element includes a rechargeable battery and the rechargeable cooling element includes a rechargeable reservoir.

22. The removable and replaceable energy storage module of claim 21, wherein the rechargeable battery and the rechargeable reservoir are configured to be recharged simultaneously.

23. A method of operating a self-contained electronic apparatus including a removable and replaceable energy storage module, comprising:
  operating the self-contained electronic equipment until at least one of a rechargeable power element and a rechargeable cooling element within a first removable and replaceable energy storage module are depleted
  replacing the first removable and replaceable energy storage module with a second removable and replaceable energy storage module
  recharging the first removable and replaceable energy storage module.

24. The method of operating a self-contained electronic apparatus of claim 23, wherein recharging the first removable and replaceable energy storage module further comprises simultaneously recharging the rechargeable power element and the rechargeable cooling element of the first removable and replaceable energy storage module.

* * * * *